United States Patent Office 3,736,232
Patented May 29, 1973

3,736,232
PROCESS FOR GROWING MICROORGANISMS
Robert G. Dworschack, James C. Chen, William R. Lamm, and Larry G. Davis, Clinton, Iowa, assignors to Standard Brands Incorporated, New York, N.Y.
No Drawing. Continuation-in-part of application Ser. No. 765,015, Oct. 4, 1968. This application Apr. 9, 1971, Ser. No. 132,818
Int. Cl. C12d 13/10
U.S. Cl. 195—65
11 Claims

ABSTRACT OF THE DISCLOSURE

Under submerged, aerobic culture conditions, microorganisms of the Streptomyces genus produce glucose isomerase. The presence of sorbitol in the fermentation medium induces microorganisms of the Streptomyces genus to produce greater quantities of glucose isomerase.

This application is a continuation-in-part of patent application Ser. No. 765,015 filed Oct. 4, 1968 now abandoned.

This invention relates to an improved process for producing glucose isomerase. In particular, the present invention relates to an improved process for producing glucose isomerase from microorganisms of the Streptomyces genus.

The major use of glucose and of corn syrups containing glucose is in food processing, for example in the baking, beverage, canning and confectionery industries, to provide sweetness, body, or to regulate crystal growth. Since glucose inherently lacks a high degree of sweetness and has a relatively bland flavor, its uses are somewhat limited. This is overcome, to some extent, by mixing glucose or corn syrup with sucrose or invert syrups to enhance total sweetness. This has not proven entirely satisfactory, however, because of economic and other factors involved. It has been recognized that if during the production of corn syrups and other glucose containing syrups, a significant proportion of the starch could be converted to fructose, syrups would be provided that are sweet enough to satisfy additional purposes.

It is known in the art that glucose can be converted to fructose by heating a solution of glucose in the presence of an alkaline catalyst. The isomerized product of such a process is usually highly colored and contains substances other than fructose and glucose that are objectionable and which may impart undesirable off-flavors. Patents have been issued on processes which are directed to improving the alkaline isomerization of glucose, for instance, U.S. Pats. 2,354,664 and 2,746,889, but, as far as we know, none has been practiced commercially, due probably to their high cost of operation and the relatively poor quality of the product.

Various microorganisms produce enzymes which isomerize glucose to fructose. These enzymes are referred to in the art as glucose isomerase. An article appearing in Science vol. 125, pp. 648–9 (1957) disclose that an enzyme derived from *Pseudomonas hydrophila* will isomerize glucose to fructose. British Pat. 1,103,394 and Japanese Pat. 17,640 (1966) disclose that microorganisms classified as belonging to the Streptomyces genus, such as *Streptomyces flavovirens*, *Streptomyces achromogenes*, *Streptomyces echinatus*, *Streptomyces albus* and *Streptomyces phaeochromogenes* produce glucose isomerase. Other microorganisms belonging to the Streptomyces genus which produce glucose isomerase are Streptomyces ATCC 21175 and ATCC 21176.

It is the principal object of the present invention to provide a method of inducing microorganisms of the Streptomyces genus to produce greater quantites of glucose isomerase.

This object and others which will be apparent from the following description are attained in accordance with the present invention by growing microorganisms of the genus Streptomyces, which produce glucose isomerase, in stages in an aqueous nutrient medium under submerged, aerobic conditions, there being present in at least the final growth stage an amount of sorbitol sufficient to induce the microorganisms to produce greater quantities of glucose isomerase as compared to the quantites of glucose isomerase produced without the presence of sorbitol.

The presence of sorbitol somehow induces the microorganisms of the Streptomyces genus to produce relatively large quantities of glucose isomerase. Another benefit provided by sorbitol is that its presence in combination with glucose maintains the pH of the fermentation or growth medium in the range where substantially optimum yields of glucose isomerase are obtained.

During the fermentation or growing of the microorganisms, it has been observed that the fermentation medium or broth has a tendency to increase in acidity. Excessive development of acidity detrimentally affects both the growth of the microorganisms and the production of glucose isomerase. Hence, this development of acidity should be avoided during fermentation.

Suitable yields of glucose isomerase are obtained when the pH of the fermentation or growth medium is maintained in the range of from about 6.2 to about 8. Although the fermentation medium may be maintained within this pH range by the addition of suitable quantities of alkali, the use of sorbitol and glucose to maintain pH control is preferred since it increases the production of glucose isomerase. In this respect, the sorbitol tends to cause an increase in the pH of the medium during fermentation and the glucose tends to cause a decrease in the pH during fermentation. Thus the amounts of sorbitol and glucose used should be such that a balance is reached where no substantial change in the pH of the medium occurs during fermentation. The amounts of sorbitol and glucose used may vary over a relatively wide range depending upon the exact conditions under which the fermentation is performed and the composition of the fermentation medium. Generally, from about 0.4 to about 2 percent glucose and from about 0.5 to about 4 percent sorbitol provide satisfactory results. However, it is preferred to use from about 0.4 to about 1 percent glucose and from about 0.5 to about 2.5 percent sorbitol. It is most preferred to use from about 0.6 to about 0.8 percent glucose and from about 0.8 to about 1.2 percent sorbitol.

It is a preferred embodiment of the present invention that a hydrolysate of a xylan-containing material be present in the growth or fermentation medium.

For purposes of the present invention the term "hydrolysate" means of fully or partially hydrolyzed xylan-containing material. When xylan is fully hydrolyzed, the principal carbohydrate present is D-xylose. In the case where xylan is only partially hydrolyzed oligosaccharides and polysaccharides are also present in addition to D-xylose.

The hydrolysates may be produced by means well known in the art. For instance, cottonseed hulls may be slurried in water and sufficient amounts of sulfuric or hydrochloric acid incorporated therein to hydrolyze a substantial portion of the xylan within a reasonable period. The period required for hydrolyzing the xylan will, of course, depend upon the temperatures, pressures and the amounts of acid used. For example, at a sulfuric acid concentration of from 0.1 to 0.5 molar and at relatively high temperatures and pressures, the period may be as short as 5 minutes, whereas at atmospheric pressure a period as long as 6 hours may be required.

Examples of hydrolyzed, xylan-containing materials which may be used in the present process are acid hydrolysates of corncobs, wheat bran, cottonseed hulls, straw, wood fibers and coarse fiber from a corn wet milling process. Also hydrolysates prepared by hydrolyzing wood pulp at high temperatures and pressures are suitable. The preferred hydrolysate is an acid hydrolysate of cottonseed hulls.

The presence of hydrolysates of xylan-containing materials in the nutrient medium for growth of the microorganisms of the Streptomyces genus stimulates the production of glucose isomerase. For example, higher yields or higher activities of glucose isomerase may generally be produced in shorter fermentation periods when hydrolysates of xylan-containing materials are present in the growth medium than when there is present a xylan-containing material which has not been hydrolyzed.

It is another preferred embodiment of the present invention that the hydrolysates of xylan-containing materials used in the nutrient medium not be subjected to extensive refining processes necessary to remove various reaction products, such as furfural, hydroxymethylfurfural and levulinic acid. These reaction products are normally toxic to certain bacterial microorganisms or impede the formation of glucose isomerase. The microorganisms from the Streptomyces genus used in the process of the present invention have the ability to grow in a nutrient medium containing hydrolysates of xylan which have not been subjected to refining and produce glucose isomerase. This provides the benefit that hydrolysates of xylan-containing materials need not be subjected to costly and lengthy refining processes prior to their use in a nutrient medium.

In commercial processes for the propagation of microorganisms, it is necessary to proceed by stages. These stages may be few or many, depending on the nature of the process and the characteristics of the microorganisms. Ordinarily, propagation is started by inoculating spores from a slant of a culture into a pre-sterilized nutrient medium usually contained in a shaker flask. In the flask, growth of the microorganisms is encouraged by various means e.g., shaking for aeration and maintenance of suitable temperature. This step or stage is repeated one or more times in flasks or vessels containing the same or larger volumes of nutrient medium. These stages may be conveniently referred to as culture development stages. The microorganisms, with or without accompanying culture medium, from the last development stage, are introduced or inoculated into a large-scale fermentor to produce commercial quantities of the microorganisms or by-products therefrom.

Reasons for growing the microorganisms in stages are numerous, but are primarily dependent upon the conditions necessary for the growth of the microorganisms and/or the production of by-products therefrom. These include stability of the microorganisms, proper nutrients, pH, osmotic relationships, degree of aeration, temperature and the maintenance of pure culture conditions during fermentation. For instance, to obtain maximum yields of enzymes, the conditions of fermentation in the final stage may have to be changed somewhat from those practiced to obtain optimum growth of the microorganisms in the culture development stages. Maintaining the purity of the medium, is also an extremely important consideration, especially where the fermentation is performed under aerobic conditions. If the fermentation is initially started in a large fermentor, a relatively long period of time will be needed to achieve an appreciable yield of microorganisms and/or by-products therefrom. This, of course, enhances the possibility of contamination of the medium and mutation of the microorganisms.

In the preferred process of the present invention, suitable proportions of acid hydrolysates of xylan-containing materials are incorporated into at least one of the final growth stages. The amount of hydrolysate added will vary somewhat depending upon the conditions under which the fermentation is carried out. Typically, the amount of hydrolysate added will be that required to obtain a xylose concentration in the nutrient medium of from about 0.25 to about 5 percent. At higher levels of hydrolysates no further benefits are obtained. The preferred amount of hydrolysate added is that necessary to obtain a xylose concentration of about 1 percent.

It is another preferred embodiment of the present invention that there be provided in at least one of the initial growth stages of microorganisms a small amount of an aqueous dispersible material.

The term "aqueous dispersible" as used herein, defines a material which is readily suspendable in an aqueous medium by mild agitation (the agitation normally required to provide aerobic conditions) or is colloidally suspendable in an aqueous medium. In order that the aqueous dispersible material may induce the microorganisms to grow in filamentous form, the dispersible material should be of the type which is not assimilated or is incompletely assimilated by the microorganisms during the growth thereof. Examples of such dispersible materials are agar, carboxymethyl cellulose, and diatomaceous earth. Small amounts of these materials improve the growth of the microorganisms as well as the yield of glucose isomerase obtained therefrom.

The presence of the aqueous dispersible materials during the growth of the microorganisms under submerged, aerobic culture conditions produces mycelia which are filamentous. In some cases, depending upon the type of material used, there may be present along with mycelia of the filamentous form a small proportion of mycelia in the form of compact spherical masses or pellets. When the aqueous dispersible materials are not present, the mycelia produced are largely in the form of compact spherical masses or pellets. The filamentous-type growth is preferred since the mycelia are more evenly dispersed throughout the nutrient medium during fermentation, and hence are more exposed to the nutrients and oxygen. Thus, because of the filamentous-type of growth, the microorganisms will grow uniformly and rapidly. Also, when an inoculum of the microorganisms having the filamentous growth characteristic is subsequently inoculated into a culture medium, rapid growth occurs as opposed to the slow growth associated with the microorganisms which are in the form of compact spherical masses or pellets.

Small amounts of the aqueous dispersible materials are suitable. For example, in the case of agar from about 0.05 to about 0.25 percent is preferred and about 0.1 percent is most preferred. In the case of carboxymethylcellulose, for instance the type marketed by Hercules Powder Company under the trade name CMC7HP., the preferred quantities are from about 0.1 to about 2 percent, and most preferably about 0.5 percent.

Examples of preferred microrganisms used in the process of the present invention are Streptomyces sp. ATCC 21175 and ATCC 21176.

Glucose isomerase is primarily produced intracellularly by the microorganisms specifically identified above (Streptomyces sp. ATCC 21175 and Streptomyces ATCC 21176). The glucose isomerase may be separated from the cells by a sonic treatment in an aqueous medium and the cells removed by filtration. The filtrate containing glucose isomerase may be used to isomerize glucose in glucose syrups. In commercial practice, however, it is economically undesirable to use such a costly procedure. In the preferred method of the present invention, the cells are removed from the fermented broth and used directly to isomerize glucose. Along with the cells, extraneous materials are also removed. Since the enzyme activity of the broth produced by the method of the present invention is unusually high, for instance as high as about from 50 to 80 glucose isomerase units per milliliter of broth, lesser amounts of the cells are necessary to achieve the desired degree of isomerization than would be required if the enzyme activity of the broth were lower. Accordingly, because the extraneous materials provide ash and promote color development in the isomerized syrup, it is advantageous to produce cells which have an extremely high glucose isomerase activity.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification, percentages are utilized to refer to percent by weight and are based on the weight of the fermentation or growth medium, unless otherwise specified.

In the following examples, the determination of glucose isomerase activity of the enzyme preparation is based on a modification of the method disclosed in the Japanese Journal of Agr. Biol. Chem. Vol. 30, No. 12, pp. 1247–1253 (1966) by Y. Takasaki. The modified method was performed as follows:

One ml. of sonicated, filtered, fermentation broth containing about 10 units of glucose isomerase and substantially no cellular material was incubated at a pH of 7.5 and a temperature of 70° C. in 9 ml. of an aqueous medium containing the following, per liter:

| | Moles |
|---|---|
| Glucose | 0.1 |
| $NaH_2PO_4$ | 0.05 |
| $MgSO_4 \cdot 7H_2O$ | 0.005 |

After one hour, the pH of the reaction mixture was lowered to about 3 with a 5 percent by weight perchloric acid solution in order to inactivate the glucose isomerase. One ml. of the reaction mixture, 0.2 ml. of a 0.2 percent cysteine hydrochloride solution, 5 ml. of a 75 percent $H_2SO_4$ solution by volume and 0.15 ml. of 0.2 percent carbazole in an alcoholic solution were placed in a test tube, mixed, and the test tube placed in a water bath maintained at 60° C. After 10 minutes the test tube was removed from the bath and cooled rapidly to room temperature. Light absorption of the solution at 560 m$\mu$ was measured and the fructose content of the sample determined. One glucose isomerase unit equals the formation of one milligram fructose under the conditions described above. Appropriate blanks were run to compensate for ketoses present in the enzyme preparation and those formed by alkaline isomerization.

Xylose content of the hydrolysates was determined by the modified Lane-Eynon method as described in the Corn Industries Research Foundation's Method E–26 in the Standard Analytical Methods of the Member Companies of the Corn Industries Research Foundation, and multiplying the reducing value calculated as dextrose by 0.85.

EXAMPLE I

This example illustrates the use of sorbitol in the final fermentation stage of Streptomyces sp. ATCC 21175.

Slant development

A culture medium was prepared comprising 0.4 percent purified xylose, 0.4 percent yeast extract, 1 percent malt extract, 2 percent agar and the remainder deionized water. The pH was adjusted to 7.3 with NaOH. This medium was sterilized by autoclaving for 20 minutes at 121° C. and made into slants. These slants were inoculated with Streptomyces sp. ATCC 21175 and incubated for 5 days at 30° C. Uniform sporulation of the microorganisms occurred.

Culture development stages

Stage A.—An aqueous culture medium, adjusted to a pH of 7, was prepared containing 1 percent purified xylose, 1 percent peptone, 1 percent yeast extract, 0.1 percent $MgSO_4 \cdot 7H_2O$, 0.3 percent $K_2HPO_4$ and 0.1 percent agar. The medium, except for the xylose, was sterilized by autoclaving for 30 minutes at 121° C. The xylose was sterilized prior to incorporation into the medium. A flask containing 150 milliliters of the medium was inoculated with spores from the slant development stage above, the flask maintained at 30° C., and agitated for 48 hours at 180 r.p.m., in order to provide aerobic culture conditions. The mycelia obtained were filamentous and free from compact, spherical masses or pellets.

Stage B.—An aqueous culture medium, adjusted to a pH of 7, was prepared containing 3 percent wheat bran ground to pass through a 28 mesh U.S. Standard size screen, 1 percent peptone, 1 percent yeast extract, 0.1 percent $MgSO_4 \cdot 7H_2O$ and 0.024 percent $CoCl_2 \cdot 6H_2O$. This medium was sterilized by autoclaving for 90 minutes at 121° C. A 2-liter flask containing 800 milliliters of the medium was inoculated with twenty milliliters from the culture development Stage A. The flask was maintained at 30° C., and agitated for 48 hours at 180 r.p.m., in order to provide aerobic culture conditions. The mycelia obtained were filamentous and free from spherical, compact, masses or pellets.

Final fermentation stage

Twenty-five liters of an aqueous medium, adjusted to a pH of 7, was prepared containing 4 percent corn steep liquor (29° Bé.), 0.024 percent $CoCl_2 \cdot 6H_2O$, 1 percent sorbitol, 0.80 percent glucose and sufficient filtered acid hydrolyzed corncob to obtain a 1 percent xylose concentration. This medium was sterilized in a stainless-steel fermentor by autoclaving for 60 minutes. The fermented medium of Stage B was inoculated into this medium. The fermentor was provided with impellers for agitating the medium, a sterile air source and a temperature control system. The fermentor was maintained at a temperature of 30° C., under pressure of 10 p.s.i.g., and 1 volume of sterile air per volume of medium per minute was introduced. After a fermentation time of 40 hours, there was obtained 73 glucose isomerase units per milliliter. The final pH of the medium was 7.8.

EXAMPLE II

This example illustrates the use of sorbitol, glucose, and said hydrolyzed cottonseed hulls in the final fermentation stage of Streptomyces sp. ATCC 21175 and the use of the glucose isomerase derived from this microorganism to convert glucose to fructose.

Inoculum was prepared according to Example 1, (Stages A and B), and incorporated into 120 liters of a sterilized aqueous medium, adjusted to a pH of 7, containing 4 percent corn steep liquor (29° Bé.), 0.024 percent $CoCl_2 \cdot 6H_2O$, 1 percent sorbitol, 0.76 percent glucose and sufficient acid hydrolyzed cottonseed hulls to obtain a 1 percent xylose concentration. The fermentation was performed under submerged aerobic conditions. After a fermentation time of 26 hours, this broth was incorporated into 4000 liters of an aqueous medium, adjusted to a pH of 7, containing 2.67 percent corn steep liquor (29° Bé.), 0.5 percent diammonium phosphate, 0.024 percent $CoCl_2 \cdot 6H_2O$, 1 percent sorbitol, 0.5 percent glucose and sufficient acid hydrolyzed cottonseed hulls to obtain a xylose concentration of 1 percent. The fermentation was performed under submerged aerobic conditions. After 46 hours the medium had a glucose isomerase activity of 76 units per milliliter. About four percent of Dicalite CP–150 (manufactured by Great Lakes Carbon Corp.) was added and the cells were separated from the fermented broth by filtration through a vacuum-rotary-drum-filter precoated with Dicalite CP–150. The wet filter cake contained about 500 glucose isomerase units per gram.

To a glucose syrup (89 D.E. and 30° Bé.) were added sufficient $MgSO_4 \cdot 7H_2O$ to obtain a molar concentration therein of 0.005 M and sufficient $CoCl_2 \cdot 6H_2O$ to obtain a molar concentration therein of 0.001 M. The pH of this glucose solution was adjusted to 6.5 and sufficient filter cake containing the glucose isomerase activity was added to obtain a dosage level of 15 glucose isomerase units per gram glucose. The solution was maintained at a temperature of 67° C., and at the pH indicated above. After 82 hours, the syrup was filtered and refined. The syrup analyzed 38.5 percent fructose and 42.5 percent glucose, the percentages being based on the solids present.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A process for growing microorganisms of the genus Streptomyces which produce glucose isomerase comprising growing the microorganisms in stages in an aqueous nutrient medium under submerged aerobic conditions there being present in at least the final growth stage a source of xylose and sufficient amounts of glucose and sorbitol to maintain the pH of the nutrient medium in the range of from about 6.2 to about 8 during the growth of the microorganisms.

2. A process for growing microorganisms of the genus Streptomyces which produce glucose isomerase as defined in claim 1, wherein there is present in the nutrient medium from about 0.4 to about 2 percent glucose and from about 0.5 to about 4 percent sorbitol.

3. A process for growing microorganisms of the genus Streptomyces which produce glucose isomerase as defined in claim 2, wherein there is present in the nutrient medium from about 0.4 percent to about 1 percent glucose and from about 0.5 to about 2.5 percent sorbitol.

4. A process for growing microorganisms of the genus Streptomyces which produce glucose isomerase as defined in claim 3, wherein there is present in the nutrient medium from about 0.6 to about 0.8 percent glucose and from about 0.8 to about 1.2 percent sorbitol.

5. A process for growing microorganisms of the genus Streptomyces as defined in claim 1, wherein the source of xylose in the nutrient medium is a hydrolysate of a xylan containing material.

6. A process for growing microorganisms of the genus Streptomyces as defined in claim 5, wherein the microorganism is Streptomyces sp. ATCC 21175 or Streptomyces sp. ATCC 21175 or Streptomyces sp. ATCC 21176.

7. A process for growing microorganisms of the Streptomyces genus as defined in claim 5, wherein a sufficient amount of the hydrolysate of a xylan containing material is present to provide a xylose concentration in the nutrient medium of from about 0.25 to about 5 percent.

8. A process for growing microorganisms of the Streptomyces genus as defined in claim 2, wherein the source of xylose in the nutrient medium is a hydrolysate of a xylan containing material.

9. A process for growing microorganisms of the Streptomyces genus as defined in claim 8, wherein a sufficient amount of the hydrolysate of a xylan containing material is present to provide a xylose concentration in the nutrient medium of from about 0.25 to about 5 percent.

10. A process for growing microorganisms of the Streptomyces genus as defined in claim 7, wherein a sufficient amount of the hydrolysate of a xylan containing material is present to provide a xylose concentration in the nutrient medium of about 1 percent.

11. A process for growing microorganisms of the Streptomyces genus as defined in claim 9, wherein a sufficient amount of the hydrolysate of a xylan containing material is present to provide a xylose concentration in the nutrient medium of about 1 percent.

References Cited

UNITED STATES PATENTS

| 3,622,463 | 11/1971 | Iizuka et al. | 195—66 R |
| 3,666,628 | 5/1972 | Dworschack et al. | 195—66 R |

FOREIGN PATENTS

| 7,430 | 1966 | Japan. |

OTHER REFERENCES

Tsumura et al., Shokuryo Kenkyusho Kenkyu Hokoku No. 19 pp. 189–193 (1965).

LIONEL M. SHAPIRO, Primary Examiner

U.S. Cl. X.R.

195—31 F